(12) United States Patent
Sekizaki et al.

(10) Patent No.: US 9,216,658 B2
(45) Date of Patent: Dec. 22, 2015

(54) BATTERY PACK VOLTAGE DETECTION APPARATUS WITH CONTROLLER WHICH IS MOUNTED ONTO A CIRCUIT INCLUDING A FIRST BATTERY PACK VOLTAGE DETECTION PART AND WHICH CONTROLS THE OTHER BATTERY PACK VOLTAGE DETECTION PARTS

(75) Inventors: Masashi Sekizaki, Makinohara (JP); Satoshi Ishikawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 815 days.

(21) Appl. No.: 13/550,948

(22) Filed: Jul. 17, 2012

(65) Prior Publication Data
US 2012/0280695 A1 Nov. 8, 2012

Related U.S. Application Data

(63) Continuation of application No. PCT/JP2011/053604, filed on Feb. 15, 2011.

(30) Foreign Application Priority Data

Feb. 15, 2010 (JP) .................................. 2010-030342

(51) Int. Cl.
*B60L 11/18* (2006.01)
*G01R 31/36* (2006.01)
(Continued)

(52) U.S. Cl.
CPC ......... *B60L 11/1855* (2013.01); *B60L 11/1864* (2013.01); *B60L 11/1879* (2013.01);
(Continued)

(58) Field of Classification Search
CPC ............ B60L 11/1855; B60L 11/1864; B60L 11/1879; B60L 11/18; Y02T 10/7061; Y02T 10/7005; H01M 10/482; H01M 10/48; H01M 2/10; H01M 10/02; G01R 31/36; Y02E 60/12
USPC ......... 320/136, 134, 132, 130, 148, 151, 152, 320/156, 157, 159, 161, 162, 164, 116, 320/122; 324/425, 426, 429, 433, 444, 434
See application file for complete search history.

(56) References Cited

U.S. PATENT DOCUMENTS 5,705,912 A * 1/1998 Ichihara ........................ 320/125
5,818,201 A * 10/1998 Stockstad et al. ............. 320/119
(Continued)

FOREIGN PATENT DOCUMENTS

| CN | 1773767 A | 5/2006 |
|---|---|---|
| EP | 1289096 A2 | 3/2003 |

(Continued)

OTHER PUBLICATIONS

Office Action dated May 30, 2014 issued by the State Intellectual Property Office of P.R. China in corresponding Chinese Application No. 201180009670.4.
(Continued)

*Primary Examiner* — Samuel Berhanu
*Assistant Examiner* — John Trischler
(74) *Attorney, Agent, or Firm* — Sughrue Mion, PLLC

(57) ABSTRACT

A voltage detection apparatus includes first to third circuit boards are provided on first to third battery packs of a battery system respectively. The first circuit board includes a first voltage detection portion detecting a voltage of the first battery pack, a control portion controlling the first voltage detection portion, and a first insulation device which connecting the first voltage detection portion with the control portion. The second circuit board includes a second voltage detection portion detecting a voltage of the second battery pack, and a second insulation device connecting the second voltage detection portion with the control portion. The third circuit board includes a third voltage detection portion connected in series with the second voltage detection portion and detecting a voltage of the third battery pack. The control portion controls the second and third voltage detection portions.

7 Claims, 5 Drawing Sheets

(51) Int. Cl.
  *H01M 10/02* (2006.01)
  *H01M 10/48* (2006.01)
  *H01M 2/10* (2006.01)
  *H02J 7/00* (2006.01)

(52) U.S. Cl.
  CPC ............ *H01M10/48* (2013.01); *H01M 10/482* (2013.01); *B60L 2240/545* (2013.01); *B60L 2240/547* (2013.01); *Y02T 10/7005* (2013.01); *Y02T 10/7061* (2013.01)

(56) References Cited

U.S. PATENT DOCUMENTS

| | | | |
|---|---|---|---|
| 5,998,969 A * | 12/1999 | Tsuji et al. | 320/132 |
| 6,133,709 A * | 10/2000 | Puchianu | 320/116 |
| 6,262,561 B1 * | 7/2001 | Takahashi et al. | 320/104 |
| 6,297,618 B2 * | 10/2001 | Emori et al. | 320/132 |
| 6,404,166 B1 * | 6/2002 | Puchianu | 320/116 |
| 6,430,066 B2 * | 8/2002 | Emori et al. | 363/43 |
| 6,762,588 B2 * | 7/2004 | Miyazaki et al. | 320/116 |
| 6,803,766 B2 * | 10/2004 | Kobayashi et al. | 324/434 |
| 6,891,352 B2 * | 5/2005 | Miyazaki et al. | 320/118 |
| 7,091,695 B2 * | 8/2006 | Miyazaki et al. | 320/116 |
| 7,471,065 B2 * | 12/2008 | Emori et al. | 320/116 |
| 7,495,418 B2 * | 2/2009 | Yano et al. | 320/166 |
| 7,508,166 B2 * | 3/2009 | Ishikawa et al. | 320/118 |
| 7,528,581 B2 * | 5/2009 | Miyazaki et al. | 320/163 |
| 7,564,218 B2 * | 7/2009 | Ooishi et al. | 320/116 |
| 7,638,979 B2 * | 12/2009 | Vandensande | 320/136 |
| 7,656,126 B2 * | 2/2010 | Sato | 320/134 |
| 7,800,342 B2 * | 9/2010 | Kobayashi et al. | 320/118 |
| 7,859,223 B2 * | 12/2010 | Gorbold | 320/119 |
| 8,154,253 B2 * | 4/2012 | Omagari | 320/134 |
| 8,212,571 B2 * | 7/2012 | Emori et al. | 324/522 |
| 8,278,878 B2 * | 10/2012 | Ishikawa et al. | 320/116 |
| 8,339,099 B2 * | 12/2012 | Emori et al. | 320/116 |
| 8,666,687 B2 * | 3/2014 | Kaneko | 702/63 |
| 8,786,256 B2 * | 7/2014 | Emori et al. | 320/118 |
| 8,791,668 B2 * | 7/2014 | Emori et al. | 320/118 |
| 8,878,540 B2 * | 11/2014 | Okamoto et al. | 324/433 |
| 8,884,584 B2 * | 11/2014 | Emori et al. | 320/116 |
| 8,912,756 B2 * | 12/2014 | Emori et al. | 320/116 |
| 2003/0044689 A1 * | 3/2003 | Miyazaki et al. | 429/320 |
| 2004/0178768 A1 * | 9/2004 | Miyazaki et al. | 320/116 |
| 2005/0242667 A1 * | 11/2005 | Emori et al. | 307/10.1 |
| 2005/0242775 A1 * | 11/2005 | Miyazaki et al. | 320/116 |
| 2005/0242776 A1 * | 11/2005 | Emori et al. | 320/116 |
| 2006/0012337 A1 * | 1/2006 | Hidaka et al. | 320/119 |
| 2006/0103349 A1 * | 5/2006 | Yamamoto | 320/116 |
| 2007/0018613 A1 * | 1/2007 | Miyazaki et al. | 320/116 |
| 2008/0061740 A1 * | 3/2008 | Miyazaki et al. | 320/116 |
| 2008/0067978 A1 * | 3/2008 | Miyazaki et al. | 320/116 |
| 2008/0079395 A1 * | 4/2008 | Miyazaki et al. | 320/118 |
| 2008/0164881 A1 * | 7/2008 | Miyamoto | 324/429 |
| 2008/0284375 A1 | 11/2008 | Nagaoka et al. | |
| 2009/0009178 A1 * | 1/2009 | Okamoto et al. | 324/434 |
| 2009/0033282 A1 | 2/2009 | Ishikawa et al. | |
| 2009/0164154 A1 * | 6/2009 | Ishikawa et al. | 702/63 |
| 2009/0169987 A1 * | 7/2009 | Miyazaki et al. | 429/158 |
| 2009/0261781 A1 * | 10/2009 | Miyazaki et al. | 320/116 |
| 2009/0284223 A1 * | 11/2009 | Miyazaki et al. | 320/116 |
| 2009/0284224 A1 * | 11/2009 | Miyazaki et al. | 320/118 |
| 2009/0302802 A1 * | 12/2009 | Miyazaki et al. | 320/116 |
| 2010/0188092 A1 * | 7/2010 | Sekizaki et al. | 324/427 |
| 2010/0286938 A1 * | 11/2010 | Kaneko | 702/63 |

FOREIGN PATENT DOCUMENTS

| | | |
|---|---|---|
| JP | 2000-173674 A | 6/2000 |
| JP | 2001-95160 A | 4/2001 |
| JP | 2007-278913 A | 10/2007 |
| JP | 2007-335337 A | 12/2007 |
| JP | 2008-86069 A | 4/2008 |
| JP | 2008289234 A | 11/2008 |
| JP | 2009-038857 A | 2/2009 |
| JP | 2010-019791 A | 1/2010 |
| WO | 2009106952 A1 | 9/2009 |

OTHER PUBLICATIONS

Office Action dated Sep. 24, 2013, issued by the Japanese Foreign Patent Office in counterpart Japanese Application No. 2010-030342.
International Search Report dated Nov. 22, 2011 from the International Searching Authority in counterpart application No. PCT/JP2011/053604.
Written Opinion dated Nov. 22, 2011 from the International Searching Authority in counterpart application No. PCT/JP2011/053604.

* cited by examiner

BATTERY PACK VOLTAGE DETECTION APPARATUS WITH CONTROLLER WHICH IS MOUNTED ONTO A CIRCUIT INCLUDING A FIRST BATTERY PACK VOLTAGE DETECTION PART AND WHICH CONTROLS THE OTHER BATTERY PACK VOLTAGE DETECTION PARTS

CROSS REFERENCE TO RELATED APPLICATION

This application is a continuation of PCT application No. PCT/JP2011/053604, which was filed on Feb. 15, 2011 based on Japanese Patent Application (No. 2010-030342) filed on Feb. 15, 2010, the contents of which are incorporated herein by reference. Also, all the references cited herein are incorporated as a whole.

BACKGROUND

1. Technical Field

The present invention relates to a voltage detection apparatus for a battery system which includes a plurality of battery packs in each of which a plurality of unit cells made up of secondary batteries are connected together.

2. Background Art

An electric circuit for a hybrid vehicle includes a high-voltage system circuit for driving a motor in addition to a low-voltage system circuit for use in driving an engine. A battery pack is used as a power supply to the high-voltage system circuit. The battery pack includes a plurality of unit cells made up of secondary batteries which are connected in series.

In a power supply system of JP-A-2008-289234, a circuit board on which a cell controller is mounted is incorporated in a cell controller box. The cell controller is a high-voltage system circuit which is connected individually to single cells which configure a battery block via detection wire harnesses and is connected to a battery controller, which is a low-voltage system, through an insulation circuit via a communication harness. The detection wire harnesses are led out for battery pack blocks respectively from the circuit board on which the cell controller is mounted. The cell controller detects periodically terminal voltages of the cell batteries to store detection results and transmits the stored detection results to the battery controller when the cell controller receives an instruction from the battery controller.

In the related power supply system described above, since the detection wire harnesses are laid out from the cell batteries configuring the battery block to the circuit board on which the cell controller is mounted, it takes some labor hours to lay out the harnesses, which deteriorates workability. Moreover, when a crash occurs in the vehicle, the detection wire harnesses are disconnected to cause a short circuit, resulting in possibilities that the power supply system catches fire and starts to emit smoke.

SUMMARY

The invention has been made in view of the problems and an object thereof is to provide a voltage detection apparatus which can solve the problems.

In order to achieve the above object, according to the present invention, there is provided a voltage detection apparatus for a battery system including a first battery pack, a second battery pack and a third battery pack, wherein a plurality of unit cells made of secondary batteries are connected to each other in each of the first, the second and the third battery packs, the voltage detection apparatus comprising:

a first circuit board that is provided on the first battery pack and that includes;

a first voltage detection portion which detects a voltage of the first battery pack;

a control portion which controls the first voltage detection portion; and a first insulation device which connects the first voltage detection portion with the control portion;

a second circuit board that is provided on the second battery pack and that includes:

a second voltage detection portion which detects a voltage of the second battery pack; and a second insulation device which connects the second voltage detection portion with the control portion; and a third circuit board that is provided on a third battery pack and that includes a third voltage detection portion which is connected in series with the second voltage detection portion and which detects a voltage of the third battery pack, wherein the control portion controls the second voltage detection portion and the third voltage detection portion.

Preferably, at least one of the first voltage detection portion, the second voltage detection portion and the third voltage detection portion includes voltage detection circuits for respectively detecting a plurality of blocks included in corresponding battery pack to be detected.

Preferably, each of the voltage detection circuits detects a voltage between unit cells arranged at both ends of each of the blocks, and the voltage detection circuits are connected in series.

According to the invention, the circuit boards including the voltage detection circuits are mounted on the battery packs whose voltages are to be detected so that information is transmitted sequentially between the control circuit of the first circuit board and the second and third circuit boards. Therefore the number of harnesses and distances for laying the harnesses for detection of the voltages are reduced to low levels. Also, the labor hours for laying out the wire harnesses can be saved. Also, the occurrence of a short circuit during the crash of the vehicle can be prevented. Further, it can be prevented that the power supply system catches fire and starts to emit smoke.

DETAILED DESCRIPTION OF THE EXEMPLARY EMBODIMENTS

Hereinafter, an embodiment of the invention will be described by reference to the drawings.

Figure 1:
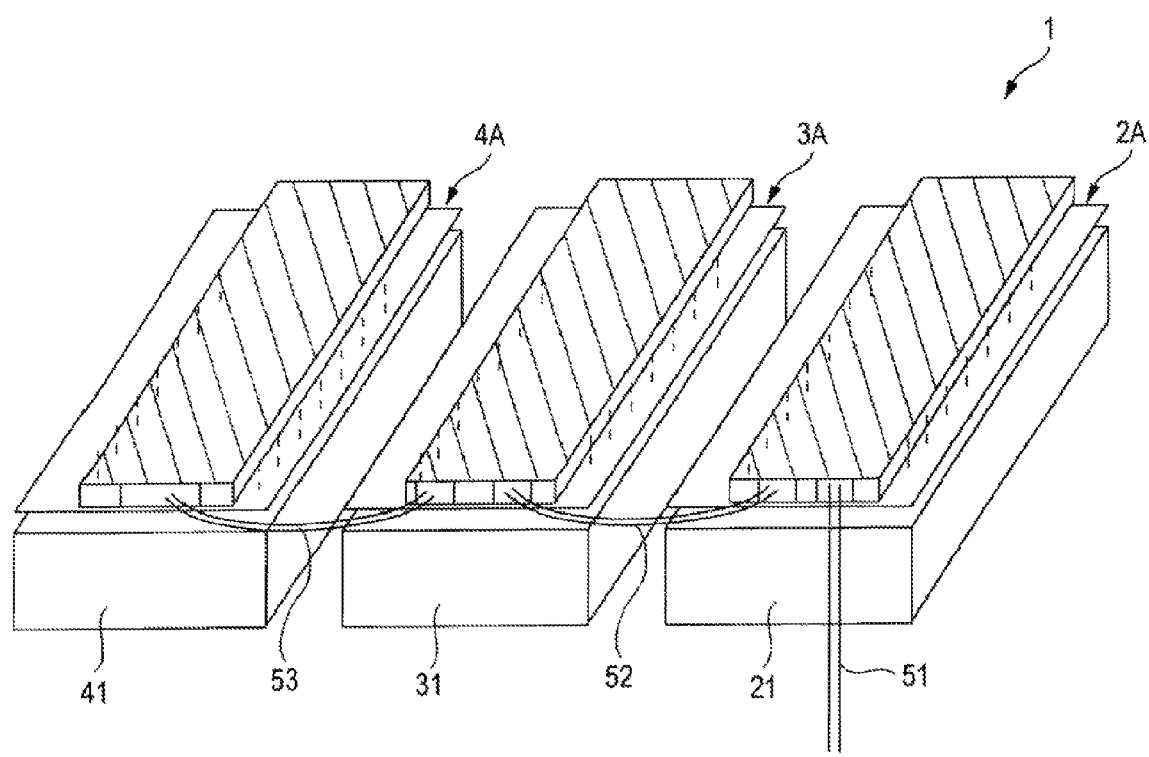
FIG. 1 is a perspective view showing schematically the configuration of a battery system of an embodiment of the invention.
Figure 2:
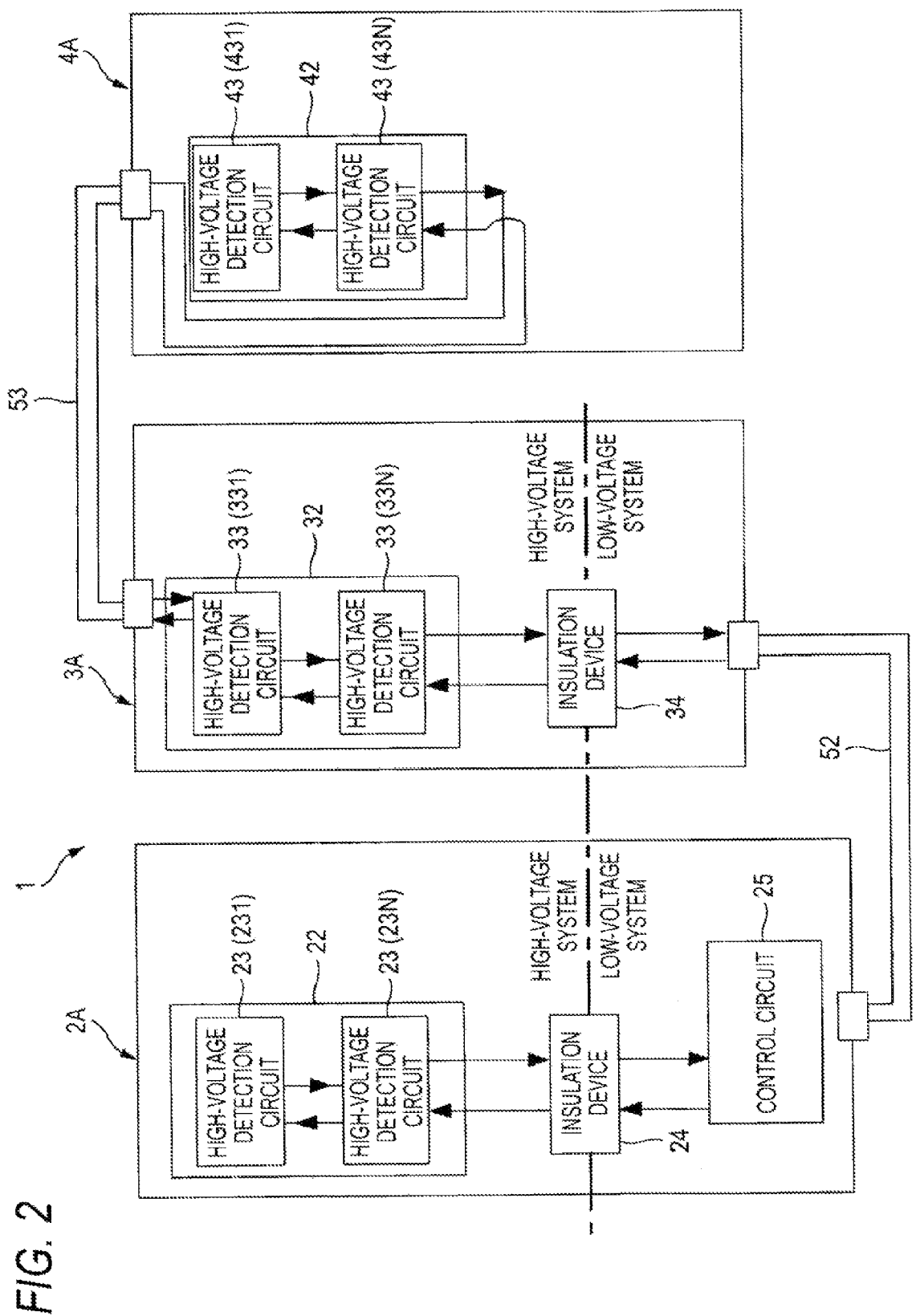
FIG. 2 is a block diagram showing conceptually a circuit configuration of a voltage detection apparatus included in the battery system.

FIG. 1 is a perspective view showing schematically the configuration of a battery system of an embodiment of the invention. FIG. 2 is a block diagram showing schematically a circuit configuration of a voltage detection apparatus included in the battery system. Note that in the following description, vertical directions used in the following description are shown in the respective drawings used in the description. These vertical directions are shown for the sake of explanation, and an actual arrangement may, of course, be different from the arrangement shown in the drawings.

A battery system shown in FIG. 1 is used to supply electric power to a motor as a drive source of a hybrid electric vehicle (HEV). This battery system includes battery packs 21, 31, 41 in each of which a plurality of unit cells are connected in series which are made up of secondary batteries such as nickel-hydrogen batteries or lithium batteries. Each of the battery packs 21, 31, 41 is divided into blocks each including a plurality of unit cells, and voltages and cell temperatures are controlled block by block by a voltage detection apparatus 1 shown in FIG. 1.

The voltage detection apparatus 1 includes a first circuit board 2A mounted on the battery pack 21, a second circuit board 3A mounted on the battery pack 31 and a third circuit board 4A mounted on the battery pack 41.

As shown in FIG. 2, the first circuit board 2A includes high-voltage detection circuits 23 (a high-voltage detection portion 22) which are provided for the unit cells which are included in the battery pack 21, a control circuit 25 for controlling operations of circuits included in the voltage detection apparatus 1 and an insulation device 24 which connects the high-voltage detection circuits 23 with the control circuit 25 in an electrically insulated state.

The high-voltage circuit 23 is a circuit for detecting voltages of the individual unit cells which are included in the block. The same number of voltage detection circuits 23 as the number of unit cells included in the battery pack 21 is mounted on the first circuit board 2A. In the event that the battery pack 21 includes N blocks, N high-voltage detection circuits 231 to 23N are mounted on the first circuit board 2A. The high-voltage detection circuit 23 amplifies voltages at ends of the respective unit cells sequentially using an operation amplifier sequentially by switching the unit cells by a switch and converts the amplified voltages using an AD converter for output. The high-voltage detection circuits 231 to 23N are connected in series, and a daisy chain communication (a daisy communication) is implemented between the high-voltage detection circuits 231 to 23N.

The control circuit 25 is a circuit for controlling the detection of voltages of the circuit boards 2A, 3A, 4A and is made up of a microcomputer. The insulation device 24 is made up of a photo coupler using light as a medium or a magnetic coupler using magnetism as a medium.

Figure 3:
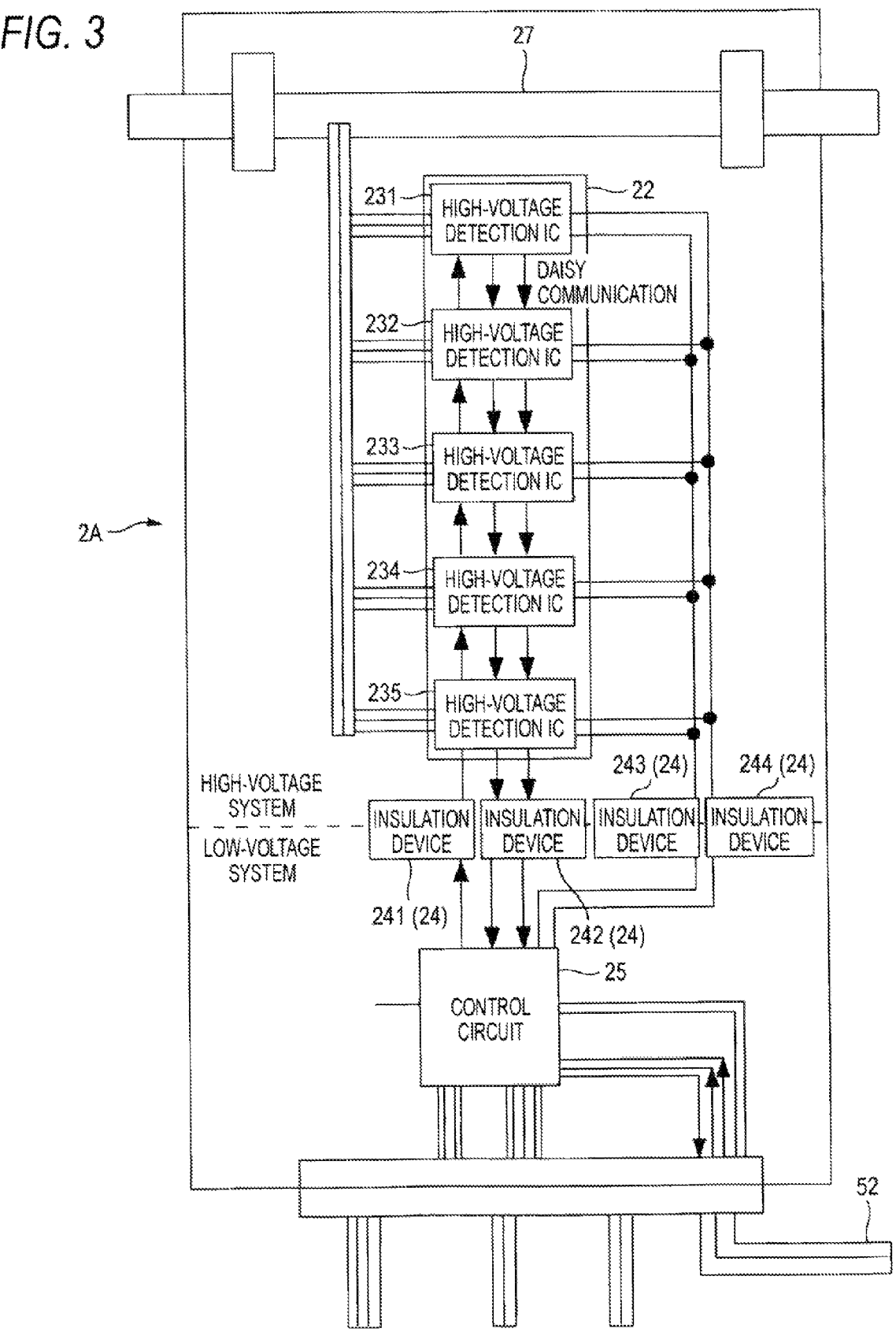
FIG. 3 is a block diagram showing an example of a circuit configuration of a first circuit board included in the voltage detection apparatus.

FIG. 3 shows an example of a configuration of the first circuit board 2A which is mounted on the battery pack 21 in the case of the battery pack 21 including five unit cells. On the first circuit board 2A, high-voltage detection ICs 231 to 235 each including the high-voltage detection circuit 23 are mounted while being connected in series with insulation devices 241, 242. In addition, the high-voltage detection ICs 231 to 235 are connected in parallel with the control circuit 25 via insulation devices 243, 244. Terminals of the respective unit cells included in the blocks of the battery pack 21 are connected to the high-voltage detection ICs 231 to 235 via a cable 27. In addition, temperature sensors for detecting cell temperatures of the unit cells included in the blocks of the battery pack 21 are connected to the high-voltage detection ICs 231 to 235 via the cable 27.

As is shown by arrows in FIG. 3, a control signal transmitted from the control circuit 25 is received at the high-voltage detection IC 235 via the insulation device 241. Thereafter, the control signal is transmitted sequentially from the high-voltage detection IC 235 to the high-voltage detection IC 231 through a daisy chain communication. Then, results of voltage and cell temperature detections at the high-voltage detection ICs 231 to 235 are transmitted sequentially from the high-voltage detection IC 232 to the high-voltage detection IC 235 through the daisy chain communication and are then supplied to the control circuit 25 via the insulation device 242. Transmission and reception of signals between the control circuit 25 and the high-voltage detection ICs 231 to 235 are effected individually via the insulation devices 243, 244.

As shown in FIG. 2, the second circuit board 3A includes high-voltage detection circuits 33 (a high-voltage detection portion 32) which are provided for the unit cells which are included in the battery pack 31 and an insulation device 34 which connects the high-voltage detection circuits 33 with the control circuit 25 of the first circuit board 2A in an electrically insulated state. In addition, the third circuit board 4A includes high-voltage detection circuits 43 (a high-voltage detection portion 42) which are provided for the unit cells which are included in the battery pack 41.

The high-voltage detection circuits 33, 43 are circuits for detecting respective voltages of unit cells which are included in the blocks of the battery packs 31, 41 and each have the same configuration of the high-voltage detection circuits 23 of the first circuit board 2A. The same numbers of high-voltage detection circuits 33, 43 as the numbers of unit cells which are included in the battery packs 31, 41 are mounted on the circuit boards 3A, 4A. High-voltage detection circuits 331 to 33N on the second circuit board 3A and high-voltage detection circuits 431 to 43N on the third circuit board 4A are connected in series, and daisy communications are effected individually among the high-voltage detection circuits 331 to 33N and the high-voltage detection circuits 431 to 43N.

Figure 4:
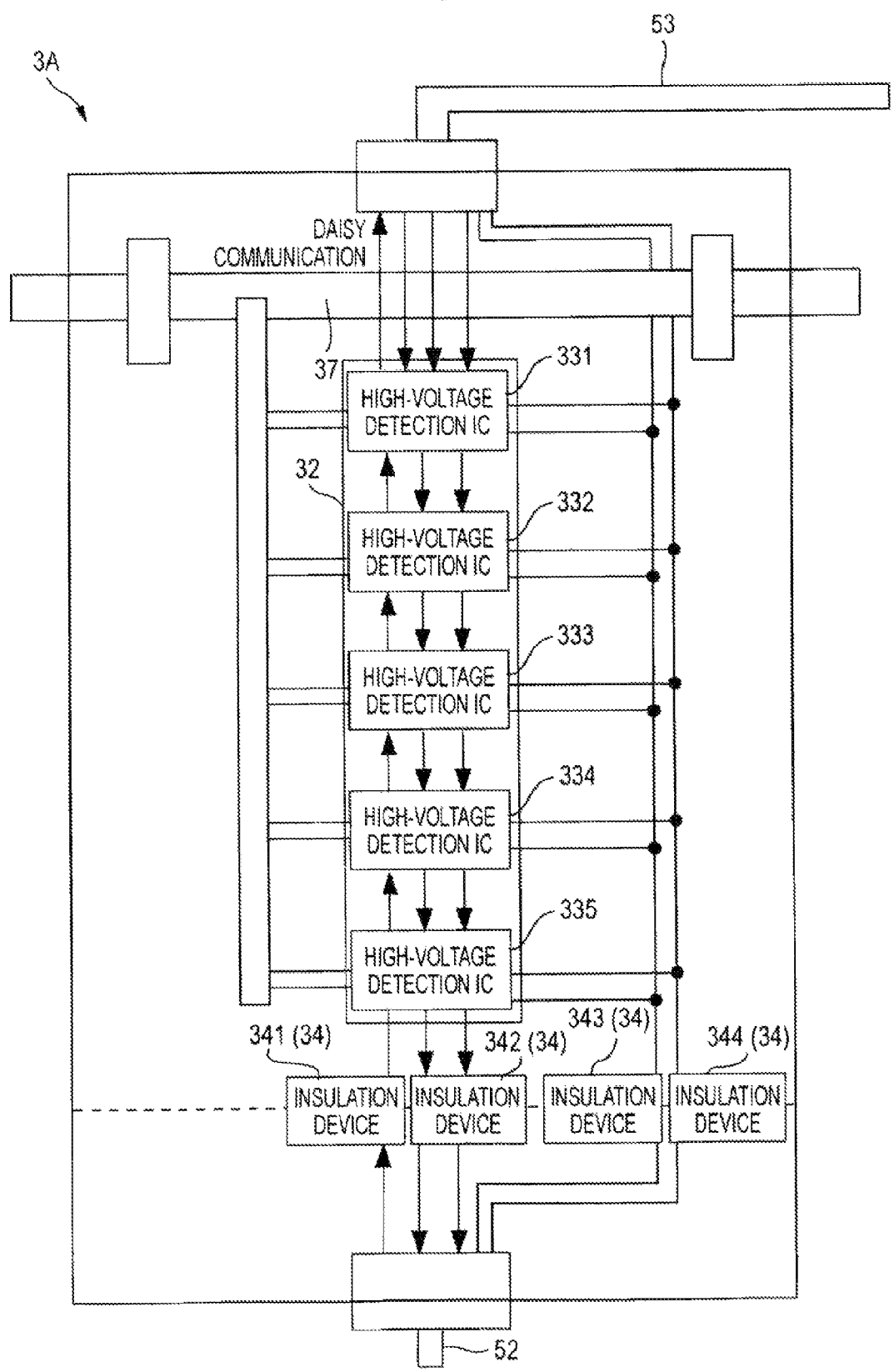
FIG. 4 is a block diagram showing an example of a circuit configuration of a second circuit board included in the voltage detection apparatus.

FIG. 4 shows an example of a configuration of the second circuit board 3A which is mounted on the battery pack 31 in the case of the battery pack 31 including five unit cells. In addition, FIG. 5 shows an example of a configuration of the third circuit board 4A which is mounted on the battery pack 41 in the case of the battery pack 41 including five unit cells.

As shown in FIG. 4, on the second circuit board 3A, high-voltage detection ICs 331 to 335 each including the high-voltage detection circuit 23 described above are mounted while being connected in series with insulation devices 341, 342. In addition, the high-voltage detection ICs 331 to 335 are connected in parallel with the control circuit 25 on the first circuit board 2A via insulation devices 343, 344. Terminals of the respective unit cells included in the blocks of the battery pack 31 and temperature sensors for detecting cell temperatures of the unit cells are connected to the high-voltage detection ICs 331 to 335 via a cable 37.

As is shown by arrows in FIG. 4, the control signal transmitted from the control circuit 25 is inputted into the high-voltage detection IC 335 from a cable 52 via the insulation device 341 and is thereafter transmitted sequentially from the high-voltage detection IC 335 to the high-voltage detection IC 331 through a daisy chain communication. Then, results of voltage and cell temperature detections at the high-voltage detection ICs 331 to 335 are transmitted sequentially from the high-voltage detection IC 332 to the high-voltage detection IC 335 through the daisy chain communication and are then supplied to the control circuit 25 on the first circuit board 2A via the insulation device 342. Transmission and reception of signals between the control circuit 25 on the first circuit board 2A and the high-voltage detection ICs 331 to 335 are effected individually via the cable 52 and the insulation devices 343, 344.

Figure 5:
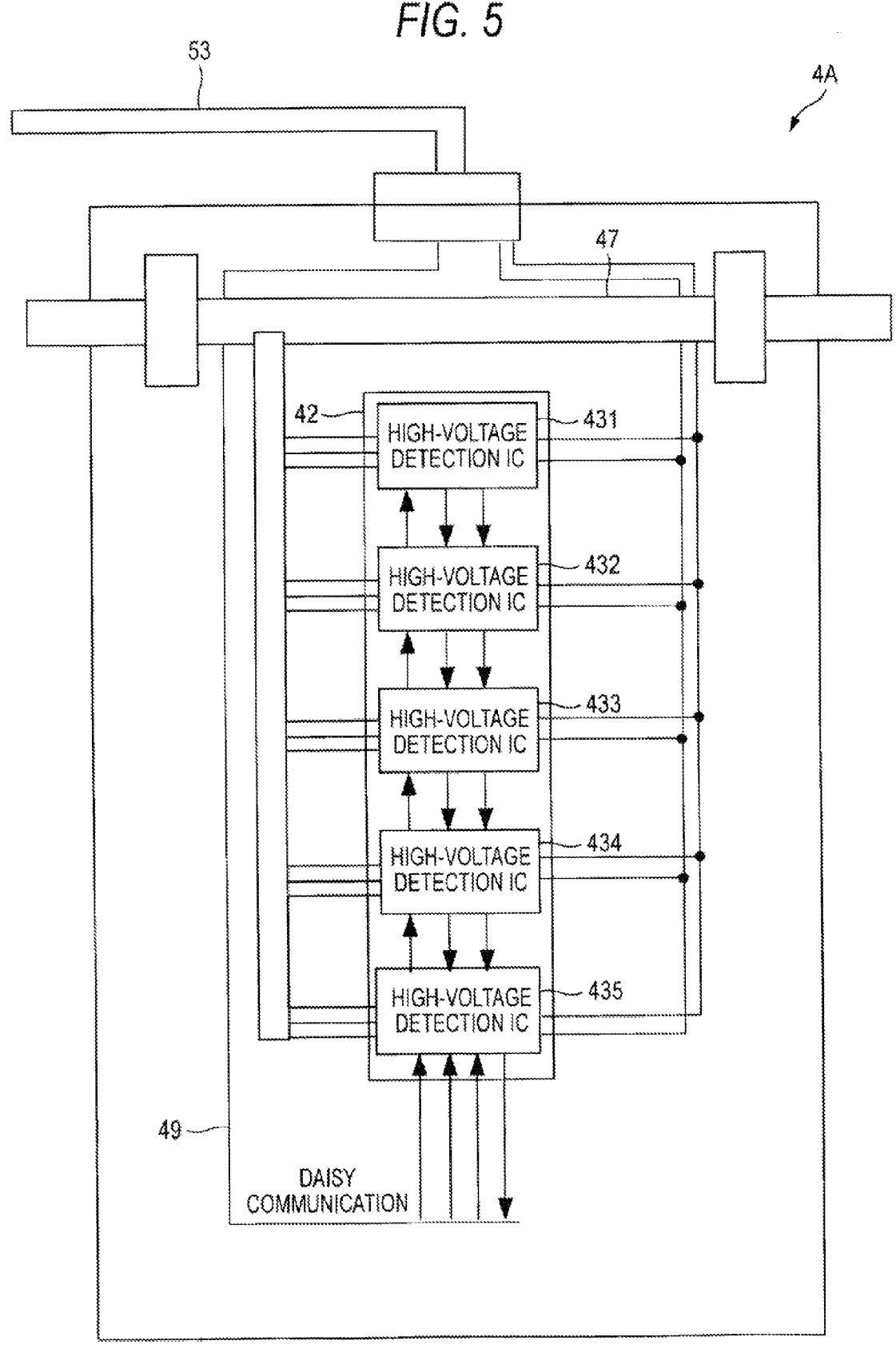
FIG. 5 is a block diagram showing an example of a circuit configuration of a third circuit board included in the voltage detection apparatus.

As shown in FIG. 5, on the third circuit board 4A, high-voltage detection ICs 431 to 435 each including the high-voltage detection circuit 23 described above are mounted while being connected in series with the high-voltage detection ICs 331 to 335 on the second circuit board 3A via a cable 53 and a wiring 49. In addition, the high-voltage detection ICs 431 to 435 are connected in parallel with the control circuit 25 on the first circuit board 2A via the cable 53, the insulation devices 343, 344 on the second circuit board 3A and the cable 52. Terminals of the respective unit cells included in the blocks of the battery pack 41 and temperature sensors for detecting cell temperatures of the unit cells are connected to the high-voltage detection ICs 431 to 435 via a cable 47.

As is shown by arrows in FIG. 5, the control signal transmitted to the high-voltage detection ICs 331 to 335 on the second circuit board 3A is inputted into the high-voltage detection IC 435 via the cable 53 and the wiring 49 and is thereafter transmitted sequentially from the high-voltage detection IC 435 to the high-voltage detection IC 431 through a daisy chain communication. Then, results of voltage and cell temperature detections at the high-voltage detection ICs 431 to 435 are transmitted sequentially from the high-voltage detection IC 431 to the high-voltage detection IC 435 through the daisy chain communication and are then inputted into the high-voltage detection IC 331 on the second circuit board 3A via the cable 53 and the wiring 49 and are then supplied to the control circuit 25 in the same manner as that in which the detection results at the high-voltage detection ICs 331 to 335 are done. Transmission and reception of signals between the control circuit 25 on the first circuit board 2A and the high-voltage detection ICs 432 to 435 are effected individually via the cables 52, 53 and the insulation devices 343, 344.

The operation of the voltage detection apparatus 1 for detecting the respective voltages of the battery packs 21 to 41 will be described by use of FIGS. 3 to 5. The control circuit 25 on the first circuit board 2A transmits an active signal to the high-voltage detection ICs 231 to 235 on the first circuit board 2A via the insulation device 24. This active signal is a signal for switching on and off the voltage supply from the battery packs 21 to 41 to the high-voltage detection ICs 231 to 235 and is transmitted individually to the respective high-voltage detection ICs 231 to 235. When the voltage supply is switched on by the active signal, a voltage is supplied from the battery packs 21 to 41 to the high-voltage detection ICs 231 to 235, whereby voltage and cell temperature detections at the battery pack 21 are enabled. In addition, the control circuit 25 transmits a detection instruction to the insulation device 24. The detection instruction transmitted to the insulation device 24 is transmitted sequentially from the high-voltage detection IC 235 to the high-voltage detection IC 231 through a daisy chain communication, whereby voltage detections at the high-voltage detection ICs 231 to 235 are executed.

The active signal is transmitted to the high-voltage detection ICs 331 to 335 on the second circuit board 3A and the high-voltage detection ICs 431 to 435 on the third circuit board 4A via the insulation device 34 on the second circuit board 3A, whereby voltage supplies are effected from the battery packs 31, 41 to the high-voltage detection ICs 331 to 335 and the high-voltage detection ICs 431 to 435, respectively. In addition, the control circuit 25 transmits the detection instruction to the insulation device 34. The detection instruction transmitted to the insulation device 34 is transmitted sequentially from the high-voltage detection IC 335 to the high-voltage detection IC 331 through a daisy chain communication and is then transmitted sequentially from the high-voltage detection IC 435 to the high-voltage detection IC 431 on the third circuit board 4A through a daisy chain communication, whereby the voltage detections at the second circuit board 3A and the third circuit board 4A are executed.

The results of detections at the high-voltage detection ICs 231 to 235 on the first circuit board 2A are transmitted sequentially from the high-voltage detection ICs 231 to 235 to the high-voltage detection ICs 232 to 235 which are connected to the insulation device 24 side through a daisy chain communication and are thereafter transmitted to the control circuit 25 from the insulation device 24. In addition, the results of detections at the high-voltage detection ICs 331 to 335 on the second circuit board 3A and the high-voltage detection ICs 431 to 435 on the third circuit board 4A are transmitted sequentially to the high-voltage detection ICs 332 to 335 and 432 to 435 which are connected to the insulation device 34 side on the second circuit board 3A through a daisy chain communication and are thereafter transmitted from the insulation device 34 to the control circuit 25.

Thus, as has been described heretofore, according to the embodiment, the high-voltage detection circuits 23, 33, 43 for detecting the voltages of the battery packs 21, 31, 41 are configured on the circuit boards 2A, 3A, 4A which are mounted on the battery packs 21, 31, 41 which are included in the battery system, and the control circuit 25 provided on the first circuit board 2A is connected in series with the high-voltage detection circuits 33, 43 on the second and third circuit boards 3A, 4A for sequential transmission of information between the second and third circuit boards 3A, 4A and the control circuit 25 through the daisy chain communication. Therefore, the detections of voltages at the battery packs 21, 31, 41 are enabled by laying out the cables 52, 53 which connect the circuit boards 2A, 3A, 4A together. Because of this, the numbers of harnesses and distances over which the harnesses are laid out for detection of voltages can be suppressed to low levels, thereby making it possible to save on labor hours taken to lay out the harnesses. In addition, since the numbers of harnesses and distances over which the harnesses are laid out can be suppressed, a risk can be reduced of the voltage detection harnesses being disconnected, thereby making it possible to prevent the occurrence of a short circuit at the time of collision of the vehicle which would otherwise result in possibilities that the battery system catches fire to start emitting smoke.

In addition, the high-voltage detection circuit 33 on the second circuit board 3A is connected in series with the high-voltage detection circuit 43 on the third circuit board 4A for sequential transmission of information between the second and third circuit boards 3A, 4A and the control circuit 25 through the daisy chain communication. Thus, no insulation device has to be provided on the third circuit board 4A, whereby the circuit installation space and cost can be reduced accordingly. In addition, a wiring or harness does not have to be laid out from the control circuit 25 on the first circuit board 2A to the third circuit board 3A, whereby the number of communication ports of the control circuit 25 can also be reduced.

Since the high-voltage detection circuits 23, 33, 43 are mounted separately on the plurality of circuit boards 2A, 3A, 4A, respectively, in the event that part of the high-voltage detection circuits 23, 33, 43 fails, only the circuit board of the circuit boards 2A, 3A, 4A which includes the failed high-voltage detection circuit has to be replaced. Thus, the reuse of the circuit boards 2A, 3A, 4A is enabled, whereby the environment-friendly configuration can be provided.

In the embodiment, while the voltage detection apparatus 1 is described as including the three circuit boards 2A, 3A, 4A, the number of circuit boards provided in the voltage detection apparatus 1 can be determined in accordance with the number of battery packs provided in the battery system. For example, in the case of the battery system including battery packs of more than three, a configuration can be adopted in which battery packs having the same configuration as the third circuit board 4A are mounted on a fourth battery pack and those onward, and circuit boards mounted on the fourth battery pack and those onward are connected in series with the third circuit board 4A. A high-voltage detection circuit on an upper circuit board which corresponds to the high-voltage detection circuit 431 and a high-voltage detection circuit on a lower circuit board which corresponds to the high-voltage detection circuit 43N are connected in series to effect a daisy chain communication between the circuit boards which constitute the circuit boards disposed at lower levels than the second circuit board 3A.

In addition, the number of high-voltage detection ICs that are to be included in the individual circuit boards 2A, 3A, 4A can be determined in accordance with the number of unit cells which are included in the individual battery packs 21, 31, 41, and the circuit boards do not necessarily have to include a plurality of high-voltage detection ICs.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The invention provides a voltage detection apparatus which can reduce the number of harnesses and distances for laying the harnesses for detecting the voltages of battery packs. Also, the labor hours for laying out the wire harnesses can be saved. Also, the occurrence of a short circuit during the crash of the vehicle can be prevented.

What is claimed is:

1. A voltage detection apparatus for a battery system including a first battery pack, a second battery pack and a third battery pack, wherein a plurality of unit cells made of secondary batteries are connected to each other in each of the first, the second and the third battery packs, the voltage detection apparatus comprising:
   a first circuit board that is provided on the first battery pack and that includes;
      a first voltage detection portion which detects a voltage of the first battery pack;
      a control portion which controls the first voltage detection portion; and
      a first insulation device which connects the first voltage detection portion with the control portion;
   a second circuit board that is provided on the second battery pack and that includes:
      a second voltage detection portion which detects a voltage of the second battery pack; and
      a second insulation device which connects the second voltage detection portion with the control portion; and
   a third circuit board that is provided on the third battery pack and that includes a third voltage detection portion which is connected in series with the second voltage detection portion and which detects a voltage of the third battery pack,
   wherein the control portion controls the second voltage detection portion and the third voltage detection portion.

2. The voltage detection apparatus according to claim 1, wherein at least one of the first voltage detection portion, the second voltage detection portion and the third voltage detection portion includes voltage detection circuits for respectively detecting a plurality of blocks included in corresponding battery pack to be detected.

3. The voltage detection apparatus according to claim 2, wherein each of the voltage detection circuits detects a voltage between unit cells arranged at both ends of each of the blocks; and
   wherein the voltage detection circuits are connected in series.

4. The voltage detection apparatus according to claim 1, wherein the first and second insulation device are made up of at least one of a photo coupler or a magnetic coupler.

5. The voltage detection apparatus according to claim 1, wherein the first circuit board and the second circuit board are only connected by a first single cable and the second circuit board and the third circuit board are only connected by a second single cable.

6. The voltage detection apparatus according to claim 1, wherein the first insulation device connects the first voltage detection portion and the control portion in an electrically insulated state, and the second insulation device connects the second voltage detection portion and the control portion in an electrically insulated state.

7. The voltage detection apparatus according to claim 1, wherein transmission and reception of signals between the control portion and the first voltage detection portion, second voltage detection portion, third voltage detection portion are performed individually.

\* \* \* \* \*